April 23, 1968 G. RESTALL ETAL 3,379,457
HITCH WITH WEIGHT-TRANSFERRING DRAWBAR COUPLING
Filed March 16, 1966 2 Sheets-Sheet 1
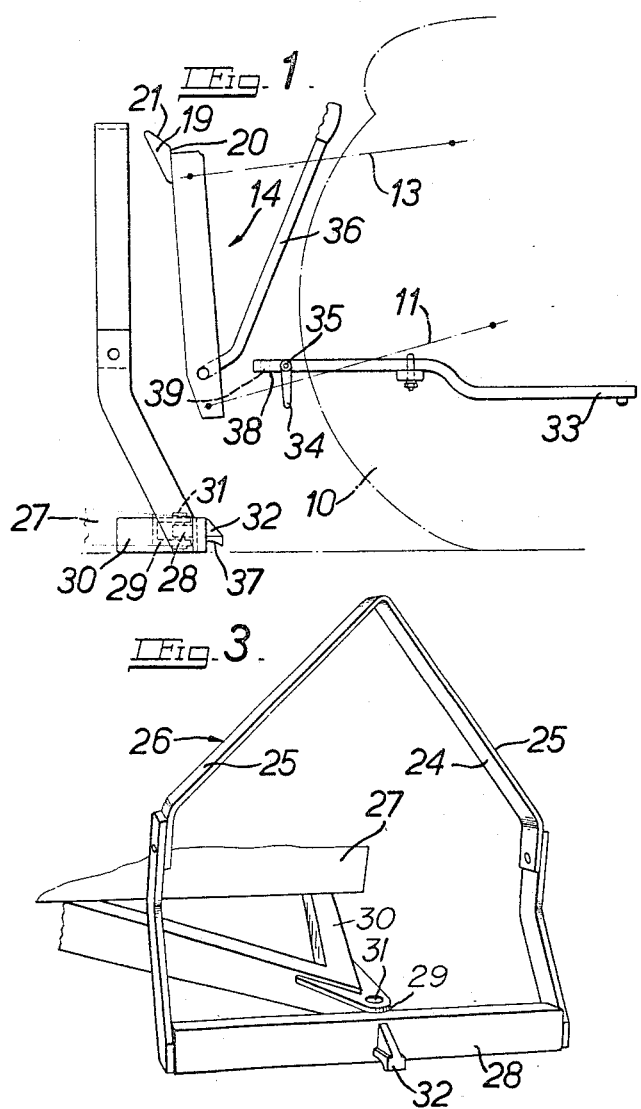

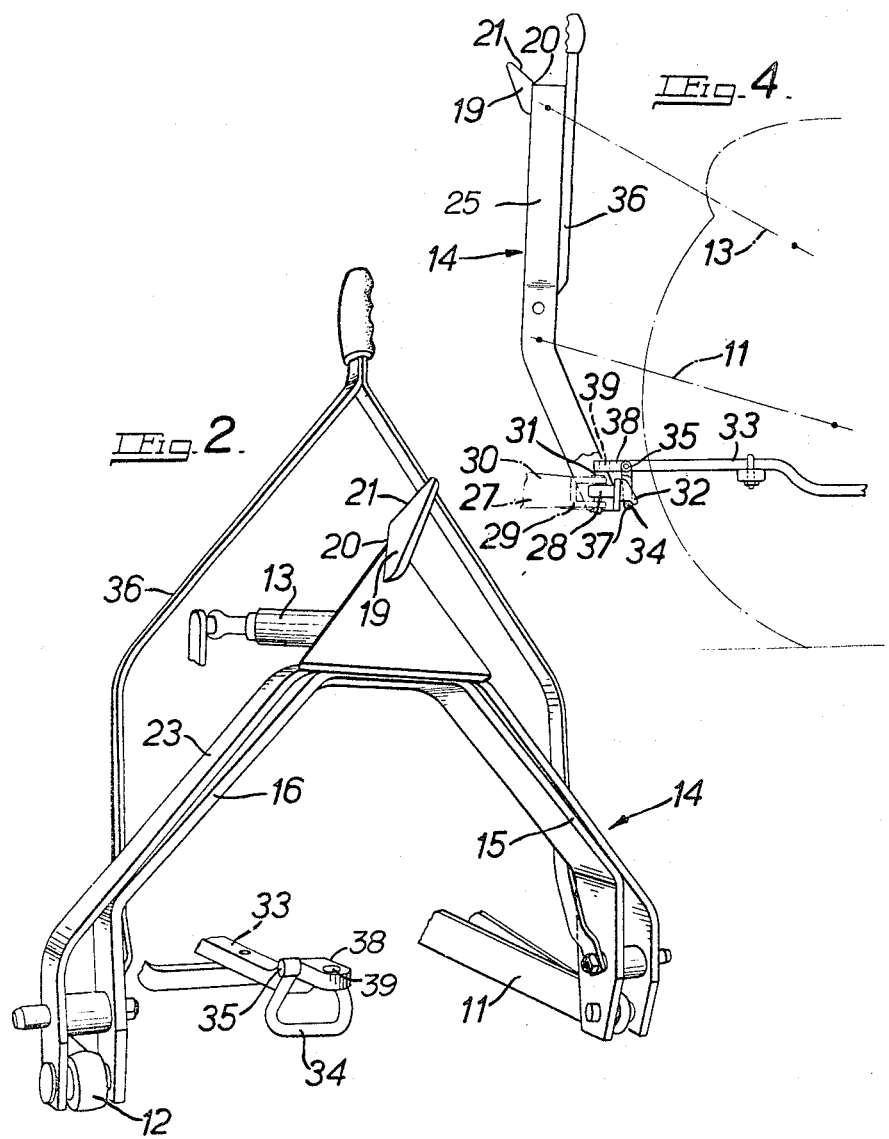

United States Patent Office 3,379,457
Patented Apr. 23, 1968

3,379,457
HITCH WITH WEIGHT-TRANSFERRING DRAWBAR COUPLING
George Restall, Sutton Coldfield, and John Brian Inskip, Bilston, England, assignors to Rubery, Owen and Company, Darlaston, Wednesbury, England, a British company
Filed Mar. 16, 1966, Ser. No. 534,847
Claims priority, application Great Britain, Mar. 16, 1965, 11,095/65
7 Claims. (Cl. 280—479)

ABSTRACT OF THE DISCLOSURE

In hitching means for a tractor and an implement means are provided for transferring to the tractor at least that part of the weight of the implement normally taken by hydraulic power means on the tractor.

---

This invention relates to improvements in hitches for coupling a tractor or other powered vehicle to a vehicle, implement, load or the like adapted to be towed, pushed and/or guided or otherwise handled or manipulated by the tractor. Our invention relates particularly to hitches of the kind comprising co-operating frames of which one frame is adapted to be attached to a three point linkage of a tractor having a pair of draft links operated by hydraulic power means and lying in the same horizontal plane for raising and lowering the frame and a third link centrally disposed above the draft links and adjustable in length to control the forward tilt of the frame, the hitch frame on the tractor being adapted to be engaged with or coupled to a complementary frame mounted on the towed vehicle or implement.

In hitches of that kind when the hitch frames are engaged or coupled the weight of the towed vehicle or implement is transferred from the draft links onto the hydraulic power means of the tractor. This is undesirable as it may lead eventually to failure of the hydraulic means.

It is known to overcome this problem by providing a pair of telescopic stays each of which is pivotally attached at one end to the tractor and pivotally attached at its other end to the free end of one draft link or to a member such as a drawbar connecting the draft links together at their free ends. The stays are extended and contracted when the draft links are raised or lowered and bolts or pins are detachably engageable with co-operating holes in members forming the stays to lock the stays and the draft links in position when the draft links are at the desired working height.

To effect locking and unlocking of the stays it is necessary either for the driver to dismount from the tractor or for this operation to be carried out by other personnel.

According to our invention in a hitch of the kind set forth at least that part of the weight of the implement or towed vehicle normally taken by the hydraulic power means of the tractor or other powered vehicle is taken directly by a normal drawbar or other convenient part of the tractor with which co-operates a part of the implement itself when the frames are engaged or coupled.

The weight is thus taken automatically by that part of the tractor during the operation of engaging or coupling the frames thereby eliminating the need for a separate manual operation.

In one arrangement the weight of the implement or towed vehicle is transferred to a suitable part of the tractor structure through a shackle which is suspended from that part. Preferably an abutment projects forwards from substantially the mid-point of a transverse crossbar joining the limbs of the implement hitch frame at or adjacent to their free ends, and the shackle is pivotally mounted for free angular movement about a pin positioned at or adjacent to the free end of the normal drawbar of the tractor to which the weight of the implement or towed vehicle is transferred.

Co-operating parts of hitching means for a tractor and an implement embodying our invention are shown in the accompanying drawings in which:

FIGURE 1 is a side elevation of the rear end of a tractor and the forward end of an implement prior to engagement or coupling of the hitching means;

FIGURE 2 is a perspective view showing a part of the tractor and the hitch frame;

FIGURE 3 is a perspective view showing a part of the implement provided with a hitch frame; and FIGURE 4 is a side elevation similar to FIGURE 1 with the hitching means engaged or coupled.

In the drawings, 10 is a tractor or other powered vehicle having a power-operated three point linkage comprising two rearwardly extending draft links 11, 12 which lie in substantially the same horizontal plane and which can be raised and lowered by power means on the tractor, and an upper link 13 centrally disposed above the draft links, and adjustable in length. A hitch frame 14 of substantially inverted U or V outline is pivotally attached at or adjacent to the free ends of the limbs 15, 16 to the draft links 11, 12. The limbs comprise opposed side members which converge upwardly to an apex, and the frame at the apex is pivotally attached to the outer end of the upper link 13 whose length is adjusted so that the frame is maintained in a substantially vertical plane.

An upwardly and rearwardly extending hook 19 secured to the rear face of the tractor frame at its apex has a straight vertical edge 20 extending above the apex of the frame and leading into a rearwardly inclined edge 21 extending downwardly from the top of the hook.

The outer sides of limbs 15, 16 of the tractor hitch frame 14 provide lateral bearing surfaces 23 adapted to engage with corresponding bearing surfaces 24 defined by the inner surfaces of the limbs 25 of a complementary inverted U or V frame 26 mounted on an implement or load 27 which is adapted to be coupled to the tractor.

The lower ends of the limbs 25 of the implement hitch frame 26 are connected by a transverse crossbar 28 by which the frame is attached to the implement in the case of the towed implement illustrated. As shown the crossbar at substantially its mid-point is received in the clevis 29 of the drawbar 30 of the implement to which it is detachably secured by a removable pin 31 passing through aligned holes in the clevis and a hole in the crossbar. This allows the frame 26 to swivel relative to the drawbar which facilitates movement of the implement relative to the tractor when the implement is being towed round a bend. At substantially the mid-point in its length the crossbar 28 carries a forwardly extending projection 32 forming an abutment which has the general form in a fore and aft direction of a right-angled triangle of which the inclined or hypotenuse side forms the top surface and slopes away from the crossbar.

The tractor is provided with a conventional drawbar 33 from the outer end of which a shackle 34 of substantially U outline is pivotally suspended so that it hangs down below the drawbar and is adapted to swing about a transverse pin 35 fixed in the drawbar.

When the tractor and the implement are to be coupled the hitch frame 14 on the tractor is lowered and the tractor is reversed up to the implement until the tractor hitch frame enters the implement hitch frame 26. The frames are engaged with the apex of the implement frame being received behind the straight vertical edge 20 on the hook 19, and the limbs of the hitch frames at or adjacent to their free ends are locked together by means controlled by a lever 36 which is operated from the tractor's seat.

In this position the weight of the implement is taken by the hydraulic power means on the tractor through the hitch frame 14 on the tractor and the draft links. However by raising the engaged hitch frames 14 and 26 by a further amount to a position shown in FIGURE 4 the abutment 32 is raised so that the inclined top surface of the abutment engages with the shackle and the shackle is swung backwards away from the frames until it disengages from the abutment and is able to swing back under its own weight into a normal position in which it hangs down freely from the drawbar 33. In this position the abutment 32 lies within the shackle.

By lowering the tractor hitch frame 14 by a small amount a recess 37 in the under surface of the abutment engages with the shackle and as shown in FIGURE 4 the shackle takes the weight of the implement which it transfers to the drawbar 33 of the tractor.

When the hitch frames are engaged as shown in FIGURE 4, raising of the tractor hitch frame 14 beyond the predetermined amount is prevented by the engagement of the upper surface of the abutment 32 with the drawbar itself.

To uncouple the tractor and the implement the hitch frames are raised to take the weight off the shackle 34. The hitch frames at or adjacent to the free ends of their limbs are unlocked by the means operable from the tractor's seat and the force on the implement hitch frame 26 is such that the abutment 32 swings free of the shackle whereupon the tractor hitch frame is lowered and the tractor is moved forward to complete the uncoupling operation.

As illustrated in the drawings, the drawbar 33 has a portion 38 which extends in a direction away from the tractor from the position at which the shackle is pivotally mounted on it, and the portion 38 has an opening 39 in it so that the tractor can be used for conventional towing operations. The extended portion 38 permits such conventional towing operations to be carried out without such operations being impeded or obstructed by the presence of the shackle 34.

We claim:
1. In a hitch for coupling a tractor having a drawbar and a three point linkage operated by power means on the tractor to an implement comprising a first hitch frame adapted to be attached to the three point linkage of the tractor, a second hitch frame adapted to be attached to the implement, complementary hitch parts on said hitch frames engageable to effect coupling of said tractor and said implement, the invention that comprises an abutment on said second hitch frame, a shackle suspended from said drawbar with which said abutment is adapted to cooperate when said complementary hitch parts are engaged, and a pivotal mounting on said drawbar for said shackle whereby at least that part of the weight of the implement normally taken by said power means when said tractor and said implement are coupled to said drawbar.

2. The invention as claimed in claim 1, wherein said shackle is substantially of U outline.

3. The invention as claimed in claim 1, wherein said abutment comprises a projection extending forwardly from said implement hitch frame and having the general form of a right-angled triangle of which the inclined side forms the top surface of the abutment, and there is an engagement between the inclined top surface of said abutment and said shackle, the engagement being arranged so that the shackle is swung away from the hitch frames and into a position in which the shackle is adapted to disengage from the abutment and swing back under its own weight into a normal position within the shackle.

4. The invention as claimed in claim 3, wherein the abutment has an undersurface adapted to engage with the shackle to transfer to it the weight of the implement when said shackle is in said normal position.

5. The invention as claimed in claim 3, wherein said abutment has an undersurface in which is formed a recess adapted to receive said shackle when said shackle is in said normal position.

6. The invention as claimed in claim 3, wherein said implement hitch frame includes two opposed limbs, and has a crossbar connecting the limbs, and said abutment comprises a projection extending forwardly from substantially the mid-point in the length of the crossbar.

7. The invention as claimed in claim 1, wherein the drawbar is extended away from the tractor from the position at which the shackle is pivotally mounted on the drawbar.

References Cited

UNITED STATES PATENTS

| | | | |
|---|---|---|---|
| 3,022,092 | 2/1962 | Bunting et al. | 280—479 |
| 3,074,501 | 1/1963 | Lane et al. | 180—14 |
| 3,220,751 | 11/1965 | Tweedale | 280—461 |
| 3,292,949 | 12/1966 | Restall | 280—479 |

LEO FRIAGLIA, *Primary Examiner.*